United States Patent [19]

de Rougemont

[11] 4,219,284

[45] Aug. 26, 1980

[54] ARTICULATED COUPLING DEVICE FOR THE BOOM OF A SAILING BOAT

[75] Inventor: Christian de Rougemont, Paris, France

[73] Assignee: Isomat, Saint-Vaast-la-Hougue, France

[21] Appl. No.: 536

[22] Filed: Jan. 2, 1979

[30] Foreign Application Priority Data

Jan. 11, 1978 [FR] France ................................. 78 00631

[51] Int. Cl.² ............................................. F16D 3/00
[52] U.S. Cl. ...................................... 403/58; 403/316
[58] Field of Search ................ 403/58, 57, 316; 64/16

[56] References Cited

U.S. PATENT DOCUMENTS

| | | | |
|---|---|---|---|
| 1,274,805 | 8/1918 | Stavish | 64/16 |
| 1,579,630 | 4/1926 | Bertsche | 64/16 |
| 2,479,129 | 8/1949 | Moore | 64/16 |
| 2,954,685 | 10/1960 | Cuq | 64/16 |

FOREIGN PATENT DOCUMENTS

| | | | |
|---|---|---|---|
| 556741 | 10/1943 | United Kingdom | 64/16 |
| 971401 | 9/1964 | United Kingdom | 64/16 |
| 995526 | 6/1965 | United Kingdom | 64/16 |

*Primary Examiner*—Andrew V. Kundrat
*Attorney, Agent, or Firm*—Garrettson Ellis

[57] ABSTRACT

The device comprises an element for rigidly fixing the articulated coupling device to a mast and a boom endpiece which are capable of pivotal displacement in perpendicular planes and each mounted on a common nut by means of a fork. Ribs and grooves formed respectively on the fork and in the nut remain in a position of interengagement after relative rotation through an angle of approximately 180° with respect to a position of introduction of the fork into the nut.

The invention is primarily applicable to the boom of a sailing boat which is pivotally coupled to a mast.

7 Claims, 7 Drawing Figures

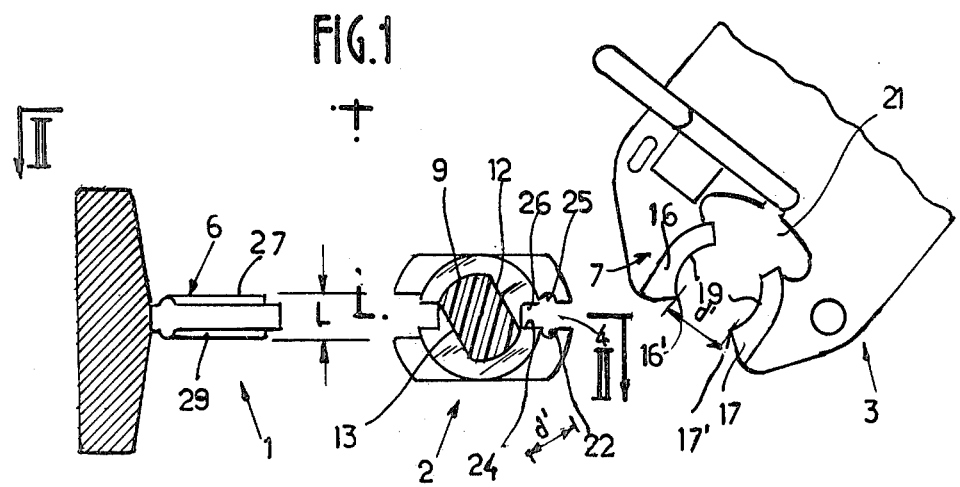
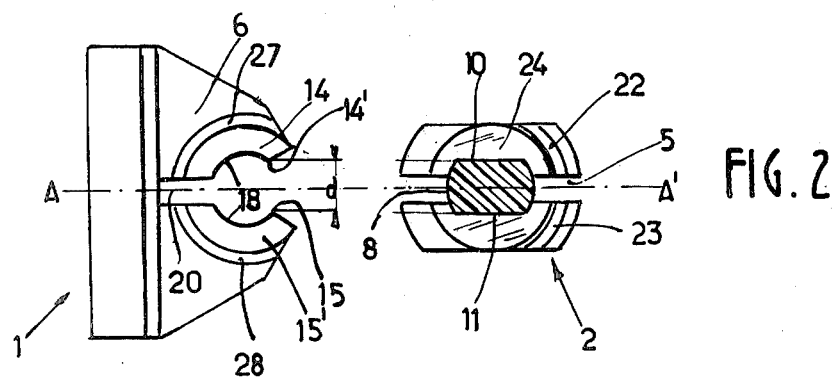
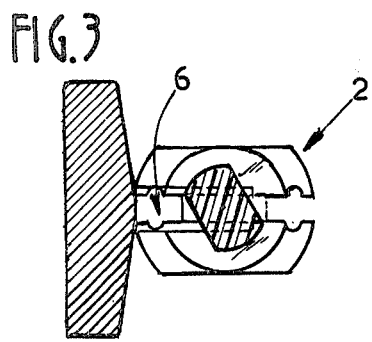
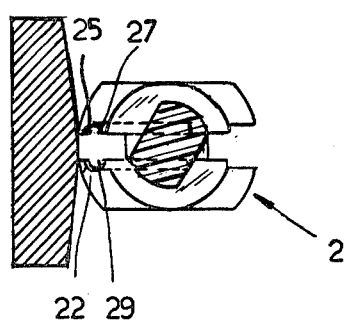

ARTICULATED COUPLING DEVICE FOR THE BOOM OF A SAILING BOAT

This invention relates to an articulated coupling device of the universal joint type and applies more especially to a device which provides an articulated coupling between the boom of a sailing boat and the mast.

Up to the present time, the coupling between one end of the boom and the mast was effected by means of a device known as a boom heel pin. This device is constituted by a first member which is rigidly fixed to the mast and has a vertical axis on which is pivotally mounted a second member having a horizontal axis for the pivotal engagement of one end of the boom. It is thus possible to obtain vertical and horizontal displacements.

The boom heel pin articulation calls for a relatively large number of parts, thus increasing the cost price as well as requiring a long time for assembly and disassembly operations.

An articulation device consisting of a nut-type universal joint is already known. In this device, two elements are pivotally mounted in perpendicular planes, each by means of a fork on a common nut. The nut is provided with two grooves or slots which extend along its entire periphery and are each located in one of two substantially perpendicular planes, the bottom of each slot being intended to form an axial pivotal motion guide for a fork. Each guide has two diametrically opposite flat faces and each fork has two arms; at least a portion of the oppositely-facing walls of said arms is of cylindrical shape whilst the distance between the free ends of the arms of the fork corresponds substantially to the distance between the flat faces of the corresponding guide of the nut. In order to assemble a fork and the nut, the nut is positioned in such a manner as to ensure that the flat faces of the correspondingly pivotal motion guide are oriented parallel to a longitudinal axis of the fork. The pivotal motion guide can thus be introduced between the two arms of the fork after it has been passed between their free ends. After relative rotation of the fork and the nut so that the flat faces of the pivotal motion guide are no longer oriented parallel to the longitudinal axis of the fork, the nut and the fork can no longer be separated. With respect to the position of assembly, however, the maximum permissible rotation is less than 180° by reason of the fact that, at this value, the flat faces of the pivotal motion guide are again oriented in a direction parallel to the longitudinal axis of the fork which can then be separated from the nut. Furthermore, it is readily apparent that, in the case of a relative orientation of the fork and the nut in the vicinity of the orientation in which the flat faces are parallel to the longitudinal axis of the fork, the contact surface between the pivotal motion guide and the cylindrical walls of the fork and which serves to prevent separation is small and therefore results in lower mechanical strength of the assembly.

In some cases and especially for pivotally mounting a boom on a mast, it is necessary to ensure that one of the elements of the articulated coupling, namely the boom in the case under consideration, is capable of pivoting horizontally through an angle of at least 180°. In consequence, a universal nut-joint of known type would not be suitable although it does have advantages over the boom heel-pin coupling in that it is simple to assemble and low in cost price.

The present invention makes it possible to overcome the disadvantages mentioned in the foregoing. The aim of the invention is to provide an articulated coupling device which offers the advantages of the nut-type universal joint and permits of pivotal displacement of one of the elements of the articulated coupling device through an angle of at least 180° without any danger of separation.

The present invention is accordingly directed to an articulated coupling device comprising two elements pivotally mounted on a common nut in perpendicular planes and in each case by means of a fork. Said nut is provided with two slots which extend along the entire periphery of the nut and each slot is located in one of the two substantially perpendicular planes. The bottom of each slot is intended to form an axial pivotal motion guide for a fork and each guide is provided with two diametrically opposite flat faces. Each fork is constituted by two arms, at least a portion of the opposite-facing walls of said arms being of cylindrical shape and the distance betweem the free ends of said arms being such as to correspond substantially to the distance between the flat faces of the corresponding guide of said nut. Said nut and one of the forks are provided with interengagement means which remain in the engaged position after relative rotational displacement through an angle of approximately 180° with respect to a position of introduction of said fork into said nut, namely a position in which the flat faces of the corresponding pivotal motion guide are oriented in a direction parallel to a longitudinal axis of said fork.

The interengagement means can be located on the one hand on at least one lateral wall of a slot of the nut and on the other hand on a corresponding wall of the fork.

In a preferred embodiment, the interengagement means are located on both lateral walls of the slot and on the two corresponding walls of the fork, thus increasing the strength of the assembly to an even greater extent.

The interengagement means can advantageously be constituted by a rib on one of the corresponding walls of the fork and of the slot and by a groove of complementary shape in the other wall.

A more complete understanding of the invention will be gained from the following detailed description and from a study of the accompanying drawings in which one embodiment of the invention is illustrated by way of example without any limitation being implied, and in which:

FIG. 1 is an exploded view of an articulated coupling device in accordance with the invention, a mounting element for rigidly fixing the device to a mast and a nut being shown in cross-section whilst an element forming a boom end-piece is shown in a side view;

FIG. 2 is a top view of the mounting element of FIG. 1 and a cross-sectional view of the nut, this view being taken along line II—II of FIG. 1;

FIGS. 3 and 4 show the assembly of the nut and the mounting element for rigidly fixing the device to the mast;

Figure 5:
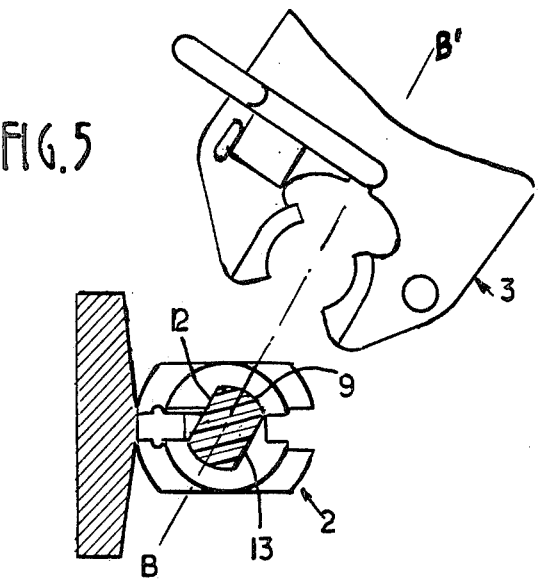
FIGS. 5 and 6 show the assembly of the nut and the boom end-piece.

The articulated coupling device illustrated in FIG. 1 comprises a mounting element 1 for rigidly fixing the device to a mast (not shown in the drawings), a nut 2 and a boom end-piece 3. The nut 2 has two slots 4 and 5 (as shown in FIGS. 1 and 2) which extend along its entire periphery and are each located in one of two perpendicular planes (the planes of section of the nut in FIGS. 1 and 2 respectively). The mounting element 1 for rigidly fixing the device to a mast and the boom end-piece 3 each having a fork 6 and 7 respectively for pivotally mounting them on the nut 2. The bottom of each slot 4 and 5 forms an axial pivotal motion guide 8 and 9 respectively for the forks 6 and 7 respectively. The pivotal motion guide 8 has two diametrically opposite flat faces 10 and 11 and the pivotal motion guide 9 also has two diametrically opposite flat faces 12 and 13. Each fork 6 and 7 has two arms 14, 15 and 16, 17 respectively. A portion of the oppositely-facing walls 18 of the arms 14 and 15 and a portion of the oppositely facing walls 19 of the arms 16 and 17 have a cylindrically shape which is complementary to that of the axial pivotal motion guides 8 and 9 respectively. The distance d between the free ends 14', 15' of the arms 14 and 15 corresponds substantially to the distance between the flat faces 10 and 11 and the distance between the free ends 16', 17'of the arms 16, 17 corresponds substantially to the distance between the flat faces 12 and 13.

Each fork 6 and 7 is provided at the rear of the cylindrical portion 18 and 19 respectively with an opening 20 and 21 respectively through which the ends of the other fork are intended to be passed.

The nut 2 and the fork 6 are also provided with interengagement means which remain in the engaged position after relative rotational displacement through an angle of approximately 180° with respect to the position of introduction of the fork 6 into the nut 2, namely a position in which the flat faces 10, 11 of the pivotal motion guide 8 are oriented in a direction parallel to a longitudinal axis A—A' of the fork 6 (as shown in FIG. 2). In the case of the nut 2, said interengagement means are constituted by two grooves 22, 23 having the shape of circular arcs, said grooves being located in the line of extension of each other in the lateral wall 24 of the slot 4, and by two identical grooves (only one groove 25 being visible in FIG. 1) which are formed in the lateral wall 26 of the slot 4.

The the case of the fork 6, the interengagement means are constituted by two ribs 27, 28 having an arcuate shape which is complementary to that of the grooves formed in the nut, said ribs being formed on the wall of the fork 6 which corresponds to the lateral wall 26 of the slot 4, and also by a second pair of identical ribs, only one of which is shown in FIG. 1 (namely the rib 29). The ribs of this second pair are formed on the wall of the fork 6 which corresponds to the lateral wall 24 of the slot 4. The positions and respective lengths of the grooves and ribs are such that, in the position of introduction of the fork 6 into the nut 2 (FIGS. 1, 2 and 3) when the flat faces 10, 11 are parallel to the axis A—A', the grooves are located substantially in the line of extension of the ribs and are therefore not in a position of interengagement. It will be noted in this connection that the ungrooved portion of the slot 4 has a width L (FIG. 1) corresponding to the thickness of the fork 6 plus that of the grooves 27 and 29. When the fork 6 is introduced into the nut 2 (as shown in FIG. 3) as a result of relative rotation, the grooves and ribs come into a position of interengagement. It can be seen in FIG. 4 that, after rotational displacement through an angle of 180°, the grooves 25 and 22 are still engaged with the ribs 27 and 29 and consequently prevent separation of the fork 6 from the nut 2 although the flat faces 10 and 11 are again parallel to the axis A—A' of the fork 6. Apart from the relative position in which the flat faces 10 and 11 are parallel to the axis A—A', the assembly of the fork 6 and of the nut 2 is carried out both as a result of cooperation of the ribs and grooves and as a result of cooperation of the cylindrical portions 18 of the fork 6 with the pivotal motion guide 8 of the nut 2. Starting from the position shown in FIG. 4, the nut 2 and the fork 6 are capable of displacement in pivotal motion through an angle of slightly less than 180° either in one direction or the other without any attendant danger of separation.

Figure 6:
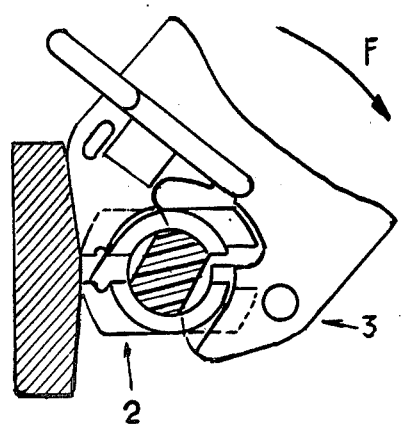
Figure 7:
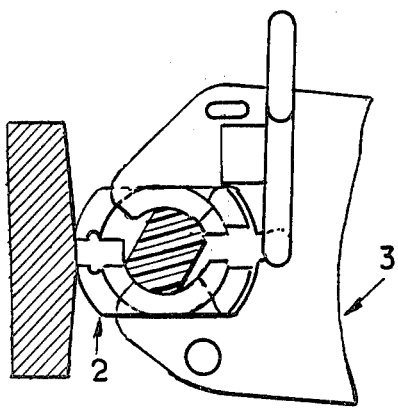
FIG. 7 shows the complete device after assembly.

For the assembly of the boom end-piece 3, this latter is so arranged that the longitudinal axis B-B' of the fork 7 is parallel to the flat faces 12 and 13 of the pivotal motion guide 9 (as shown in FIG. 5). The fork 7 is then introduced into the slot 5 of the nut 2 and then rotated in the direction of the arrow F (FIG. 6) to the position shown in FIG. 7.

As will be readily apparent, the invention is not limited to the embodiment hereinabove described with reference to the accompanying drawings but permits of many alternative forms according to the applications which may be contemplated.

The invention applies especially to all nut-type universal joints in which one of the articulated elements must be capable of pivoting through an angle of at least 180°.

We claim:

1. An articulated coupling device comprising two elements, each element defining a fork, and a nut, each fork being pivotally mounted on said nut in perpendicular relation to each other, the nut being provided with a pair of slots for receiving said forks extending about essentially the entire periphery of said nut with each slot being located in one of a pair of essentially perpendicular planes, the bottom of each slot being of a shape to define a pivotal motion guide for the respective fork occupying said slot, each motion guide being provided with two diametrically opposed flat faces, each fork comprising a pair of arms in which at least a portion of each of the oppositely-facing walls of said arms is of the shape of a cylindrical section, and the distance between the free ends of said arms corresponds substantially to the distance between the flat faces of the respective slot with which said arms are engaged to permit said arms to pass across said flat faces, said nut and one of said forks defining interengagement means located on at least one lateral wall of one slot of said nut and on at least one corresponding wall of said one fork, said interengagement means permitting the separation and the interlocking of said nut and one fork in one relative rotational position of said one slot and fork, being adapted to enter into engaged mode after relative rotation between said nut and one fork from said one relative rotational position.

2. A device according to claim 1, wherein the interengagement means are located on both lateral walls of the one slot and on the two corresponding walls of the one fork.

3. A device according to claim 1 wherein the interengagement means are constituted by a rib on one of the corresponding walls of the one fork and of the one slot and by a groove of complimentary shape in the other wall of said one fork and slot.

4. A device according to claim 3, wherein the interengagement means are constituted by two arcuate ribs on the one fork and by two arcuate grooves in the line of extension of each other in the corresponding lateral wall of the one slot, the positions and respective lengths of said grooves and said ribs being such that they engage with each other only after relative rotational displacement with respect to the position of introduction of the one fork into the nut.

5. The device of claim 1 in which said interengagement means achieves a maximum interengagement between said one fork and nut upon a relative rotation of essentially 180° between the fork and nut from said one relative rotational position of said one fork and nut.

6. The device of claim 1 in which the planes of one of said diametrically opposed flat faces defines an acute angle with the planes of the other diametrically opposed flat faces.

7. The device of claim 1 in which said forks are each adapted to embrace said nut over more than 180° of the nut.

* * * * *